(12) United States Patent
Shinoda

(10) Patent No.: US 7,232,313 B1
(45) Date of Patent: Jun. 19, 2007

(54) FOLDING ELECTRIC APPARATUS

(75) Inventor: Takao Shinoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/362,413

(22) Filed: Feb. 27, 2006

(30) Foreign Application Priority Data

Nov. 30, 2005  (JP) ............................. 2005-346355

(51) Int. Cl.
*H01R 39/00* (2006.01)
(52) U.S. Cl. ...................................................... 439/31
(58) Field of Classification Search ................. 439/31, 439/164, 165; 16/253, 254; 361/679, 681
See application file for complete search history.

(56) References Cited

U.S. PATENT DOCUMENTS

| | | | |
|---|---|---|---|
| 6,857,879 B2 * | 2/2005 | Sawada et al. | 439/31 |
| 6,872,088 B2 * | 3/2005 | Watanabe | 439/165 |
| 6,926,546 B2 * | 8/2005 | Kurokawa | 439/165 |
| 7,094,084 B2 * | 8/2006 | Lee | 439/165 |

FOREIGN PATENT DOCUMENTS

| | | |
|---|---|---|
| JP | 2002-134938 | 5/2002 |
| JP | 2003-304310 | 10/2003 |

* cited by examiner

*Primary Examiner*—Khiem Nguyen
(74) *Attorney, Agent, or Firm*—Staas & Halsey LLP

(57) ABSTRACT

A folding electronic apparatus is proposed, the rigidity of the hinge of which is sufficiently high, in which signal wires for connecting a movable portion with a stationary portion can be easily incorporated. The apparatus includes: a stationary portion (2) and a movable portion (3) which are connected to each other by a hinge (4), capable of being opened and closed, the hinge includes: a pipe portion (32) having a first slit (35) on a side wall, the pipe portion being attached to one of the movable portion and the stationary portion; and a hollow shaft (24) having a second slit (25) on the side wall, the hollow shaft (24) being attached to the other of the movable portion and the stationary portion, the hollow shaft (24) being engaged inside the pipe portion, wherein the first and second slits extend to positions shifted from an engaging portion of the pipe portion with the hollow portion in the axial direction and define opening portions (25*a*, 35*a*) of the first and second slits.

18 Claims, 7 Drawing Sheets

FOLDING ELECTRIC APPARATUS

BACKGROUND OF THE INVENTION

1. Field of the Invention

The present invention relates to a folding electric apparatus. More particularly, the present invention relates to a folding electric apparatus having a hinge (an opening and closing mechanism). The present invention can be applied to various folding electronic apparatus having a hinge, such as a stationary communication terminal and a portable electronic apparatus, for example, a mobile phone, a portable communication terminal, a portable electronic note, a portable electronic book, a portable electronic dictionary and so forth.

The folding electronic apparatus includes: a first housing, for example, a stationary portion, in which an operation portion is mainly provided; and a second housing, a movable portion, in which a display portion such as a liquid crystal display is mainly provided, wherein the first housing and the second housing are connected with each other by a hinge, and the movable portion can be opened and closed with respect to the stationary portion being turned round the hinge. Since the folding electronic apparatus can be operated so as to be opened and closed, as described above, it has been conveniently used. Therefore, the number of the folding electronic apparatus to be used tends to remarkably increase every year. Especially according to the increase in the use of the folding electronic apparatus, there is a request for enhancing the mechanical strength of the hinge which is frequently opened and closed. Further, when the first housing and the second housing are electrically connected to each other by signal wires, the wiring must be devised so that the apparatus can endure opening and closing motions, which are frequently conducted, irrespective of a state of the apparatus to be opened and closed.

2. Description of the Related Art

In the conventional folding electronic apparatus in which the movable portion and the stationary portion are connected to each other by the hinge, the holding mechanism for holding the hinge is composed separately from the structure reinforcing member composing the movable portion and the stationary portion, that is, the holding mechanism for holding the hinge is composed separately from the chassis of the movable portion and the stationary portion. Therefore, the following problems may be encountered in the conventional folding electronic apparatus. In the conventional folding electronic apparatus, the hinge is not composed integrally with the chassis as described above. Therefore, the rigidity of the hinge is not sufficiently high compared with the rigidity of the structural members of the chassis. Accordingly, it is difficult to maintain the accuracy of a rotary shaft to be high. Further, when a shock is given to the apparatus, the hinge is independently deformed, and the rigidity of the hinge is lowered.

Further, the following problem may be encountered. In the conventional folding electronic apparatus, when the movable portion and the stationary portion are connected to each other by the signal wires at the time of assembling, the assembling work is complicated.

Concerning the structure of the conventional folding electronic apparatus, JP-A-2002-134938 discloses a folding housing structure having a water-proofing structure. According to this Patent Document, rising walls are formed round the hinge and on the side, and ribs for water-proofing are formed inside. When water absorption sheets are arranged inside an upper and a lower rear case, water can be prevented from entering from a gap of the hinge into a space.

According to the folding electronic apparatus disclosed in JP-A-2003-304310, when a hinge cover is divided into a plurality of pieces, a main body portion can be classified. Further, the generation of rattling in the hinge can be prevented.

As described above, in the conventional folding electronic apparatus, the hinge is not integrated with the chassis which is a structural reinforcing member composing the apparatus housing. Therefore, the rigidity of the hinge is not sufficiently high. Accordingly, it is difficult to maintain the accuracy of the rotary shaft to be sufficiently high. Further, there is a possibility that the hinge is independently deformed when a shock is given to the apparatus. Furthermore, in the conventional folding electronic apparatus, it is difficult to incorporate the signal wires extending between the movable portion and the stationary portion.

SUMMARY OF THE INVENTION

Therefore, it is an object of the present invention to propose a folding electronic apparatus characterized in that: the rigidity of the hinge is sufficiently high; and it is easy to incorporate into the apparatus the signal wires extending between the movable portion and the stationary portion.

In order to accomplish the above-mentioned object, the present invention provides a folding electronic apparatus in which a first housing and a second housing are connected to each other by a hinge, capable of being opened and closed with respect to each other, the hinge including: a pipe portion having a first slit on a side wall, the pipe portion being attached to one of the first housing and the second housing; and a hollow shaft having a second slit on the side wall, the hollow shaft being attached to the other of the first housing and the second housing, the hollow shaft being engaged inside the pipe portion, wherein the first and second slits extend to positions shifted from an engaging portion of the pipe portion with the hollow portion in the axial direction and define opening portions of the first and second slits.

According to the above structure, in the case where the first housing and the second housing are electrically connected to each other by signal wires, the signal wires are laid in the pipe portion and the hollow shaft of the hinge, the signal wires are drawn out from the first and second slits opening portion and both end portions of the signal wires can be connected to the first and second housings. Therefore, the signal wires can be easily laid and incorporated. Further, even when the folding electronic apparatus is repeatedly opened and closed, the durability can be maintained.

According to the present invention, a folding electronic apparatus further comprises: a first printed circuit board attached inside one of the housings; a second printed circuit board attached inside the other of the housings; and signal wires for electrically connecting the first printed circuit board with the second printed circuit board, wherein one end portion of the signal wires connects to the first printed circuit board, enters the first slit opening portion of the pipe portion, passes inside the pipe portion and the hollow shaft portion, comes out from the second slit opening portion of the hollow shaft portion and connects to the second printed circuit board.

Due to the above structure, the signal wires can be smoothly connect the first printed circuit board with the second printed circuit board. Further, it is easy to lay and assemble the signal wires. Furthermore, even when the folding electronic apparatus is repeatedly opened and closed, the durability can be maintained.

In a folding electronic apparatus of the present invention, the signal wires are formed into a flexible printed circuit. The flexible circuit plate includes: a first base portion connected to the first printed circuit board; a first portion extended from the first base portion in the direction perpendicular to the hinge axis; a portion bent from the first portion in the direction parallel with the hinge axis; a second portion bent from a portion which extends in the direction parallel with the hinge axis, extending again in the direction perpendicular to the hinge axis; and the second base portion connected to the second portion and connected to the second printed circuit board, wherein the flexible circuit plate is formed into a plane shape.

Due to the above structure, while the slit of the pipe portion and the slit of the hollow shaft are being aligned with each other, a portion of the flexible circuit plate, which functions as signal wires and is parallel with the hinge shaft, is inserted into the slit, the first portion and the second portion are respectively drawn out from the slit opening portion of the pipe portion and the slit opening portion of the hollow shaft, and base portions at both end portions can be respectively connected to the first housing and the second housing. Accordingly, the flexible circuit plate can be easily incorporated.

The pipe portion includes: a pipe formed portion integrally formed on the first chassis which is a structural reinforcing member composing one of the housings; and a pipe member engaged inside the pipe formed portion, wherein slit portions are respectively formed in the pipe formed portion and the pipe member at positions corresponding to each other, and these slits are aligned with each other to form the first slit.

Due to the above structure, the hinge includes members which are portions of the first and second chassis which are the structural reinforcing members of the first housing and the second housing. Alternatively, the hinge includes members fixed to the first and the second chassis. Therefore, the rigidity of the hinge can be maintained high. Further, even when the folding electronic apparatus is repeatedly used over a long period of time, the accuracy of the hinge shaft can be maintained high.

In the folding electronic apparatus of the invention, both sides of the pipe portion of one of the housings are open, the hollow shaft is engaged with the first opening portion, and a hinge module is inserted into the second opening portion and the bearing portion of the other of the housings.

The present invention provides a folding electronic apparatus in which a first housing and a second housing are connected to each other by a hinge being capable of being opened and closed, the hinge including: a pipe portion integrally formed with a structural reinforcing member of the first housing; a bearing portion integrally formed with a structural reinforcing member of the second housing; and a hollow shaft fixed to the structural reinforcing member of the second housing, wherein the hollow shaft is pivotally inserted into and engaged with one of the opening portions of the pipe portion, and a hinge module penetrates the other side of the pipe portion and the bearing portion.

Due to the above structure, the rigidity of the hinge can be maintained sufficiently high, and the signal wires for connecting the first housing with the second housing can be easily incorporated and laid.

DETAILED DESCRIPTION OF THE PREFERRED EMBODIMENTS

Referring to the accompanying drawings, an embodiment of the present invention will be explained in detail below.

Figure 1A:
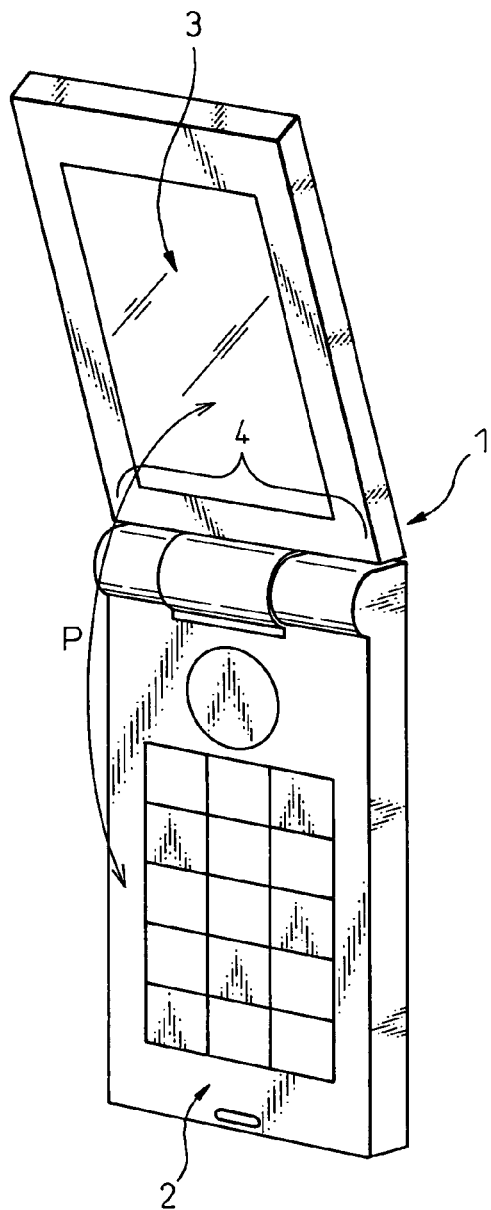
FIG. 1(a) is a perspective view showing a folding mobile phone of the present invention in an open state, wherein the view is taken from the liquid crystal display face side.
Figure 1B:
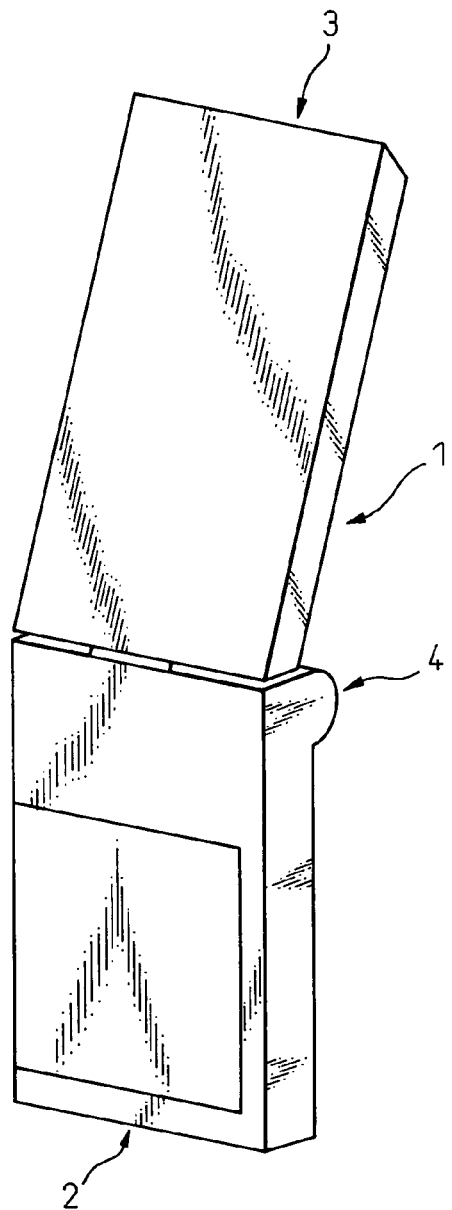
FIG. 1(b) is a perspective view showing a folding mobile phone of the present invention in an open state, wherein the view is taken from the back face side.

FIGS. 1(a) and 1(b) are views showing a folding mobile phone to which the present invention can be applied. FIG. 1(a) is a perspective view showing a folding mobile phone of the present invention in an open state, wherein the view is taken from the liquid crystal display face side. FIG. 1(b) is a perspective view showing a folding mobile phone of the present invention in an open state, wherein the view is taken from the reverse face side.

The folding mobile phone 1 is composed as follows. The first housing (the stationary portion) 2, in which the input operating portion such as various keys and buttons and the telephone microphone are provided, and the second housing (the movable portion) 3, in which the liquid crystal display portion and the telephone ear phone are provided, are connected to each other by the hinge 4 so that the first housing 2 and the second housing 3 can be opened from and closed to each other as shown by arrow P. Therefore, the electronic apparatus 1 can be opened and closed.

When the folding mobile phone 1 is used, the apparatus 1 is opened as shown in the drawing, and various inputting operation, the sending and receiving work and the conversation are conducted in this open state. When the apparatus 1 is opened, the first housing 2 and the second housing 3 are opened in such a manner that an angle of about 165° is formed between the first housing 2 and the second housing 3. In order to temporarily fix the first housing 2 and the second housing 3 at this open position, motions of the first housing 2 and the second housing 3 are regulated by a stopper not shown in FIG. 1.

When the folding mobile phone 1 is not used, the apparatus 1 is put into a closed state, so that it can be conveniently put away. When the mobile phone 1 is closed, an angle formed between the first housing 2 and the second housing 3 is approximately 0°. The first housing 2 and the second housing 3 are regulated by a stopper (not shown) so that they can be temporarily fixed at this position.

The hinge 4 basically includes a shaft and a bearing mechanism. That is, the hinge 4 includes: a pair of bearings which are provided on the same axis in one end portion of the first housing 2 on the second housing 3 side; and a bearing provided in one end portion of the second housing 3 on the first housing 2 side in such a manner that the bearing is opposed to the pair of bearings arranged on the first housing 2 side; and a shaft portion penetrating these bearings.

As described before, in the hinge 4, the stopper mechanism not shown in FIG. 1 is provided. Due to the stopper mechanism, when the first housing 2 and the second housing 3 are closed to each other, the closed state can be maintained. When the first housing 2 and the second housing 3 are opened from each other by a predetermined angle, the open state can be maintained.

In this connection, the shaft and the bearing mechanism composing the hinge 4 may be composed as follows. On the contrary to the arrangement described above, a pair of bearings are provided on the same axis at an interval at one end portion of the second housing 3 on the first housing 2 side, and one bearing to be engaged with the pair of bearings is provided at one end of the first housing 2 on the second housing 3 side, and a shaft portion penetrating these bearings is provided.

Figure 2:
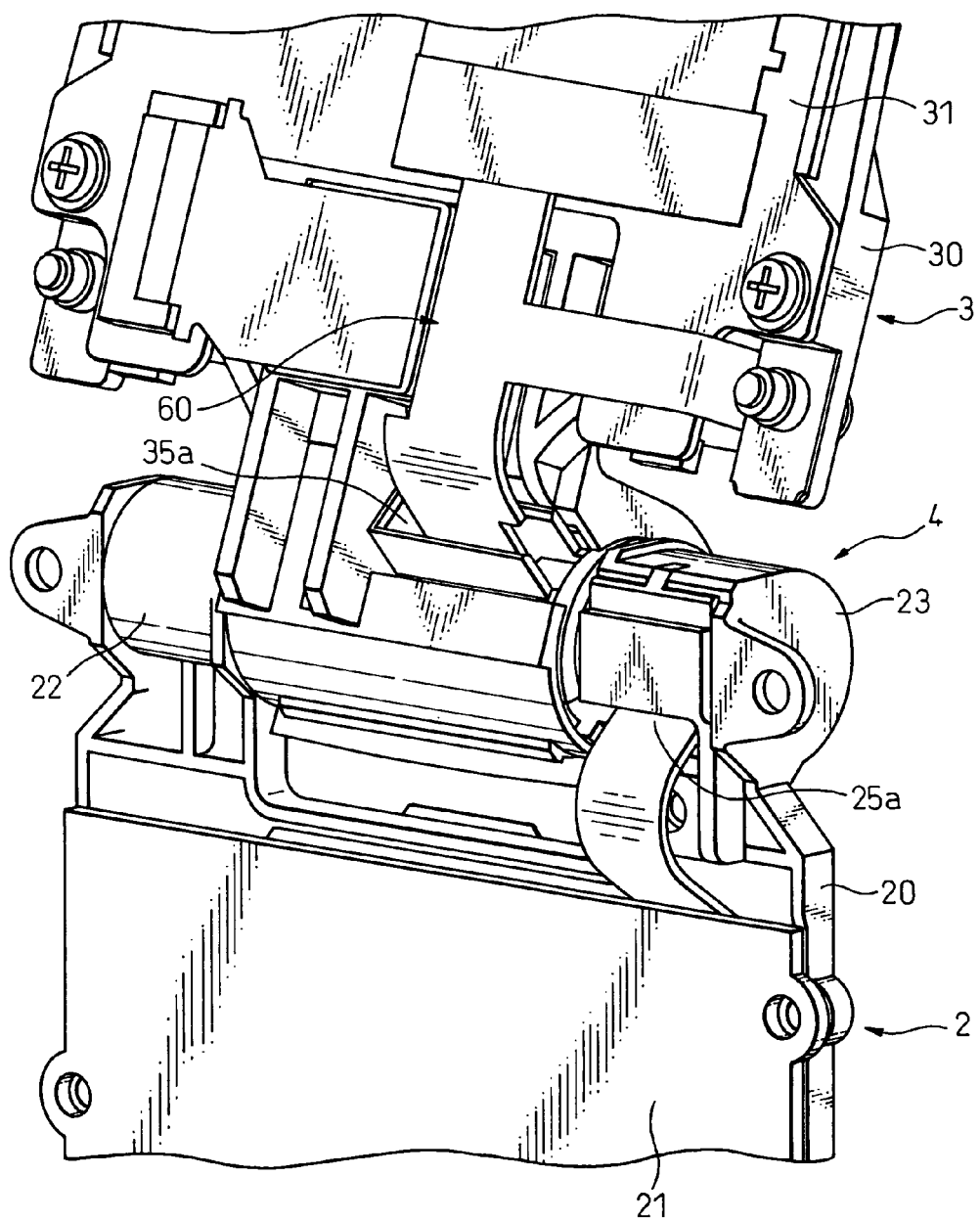
FIG. 2 is a perspective view showing a folding mobile phone of the present invention, especially showing a hinge of the folding mobile phone, wherein the view is taken from the back face side after the outside cover has been removed.
Figure 3:
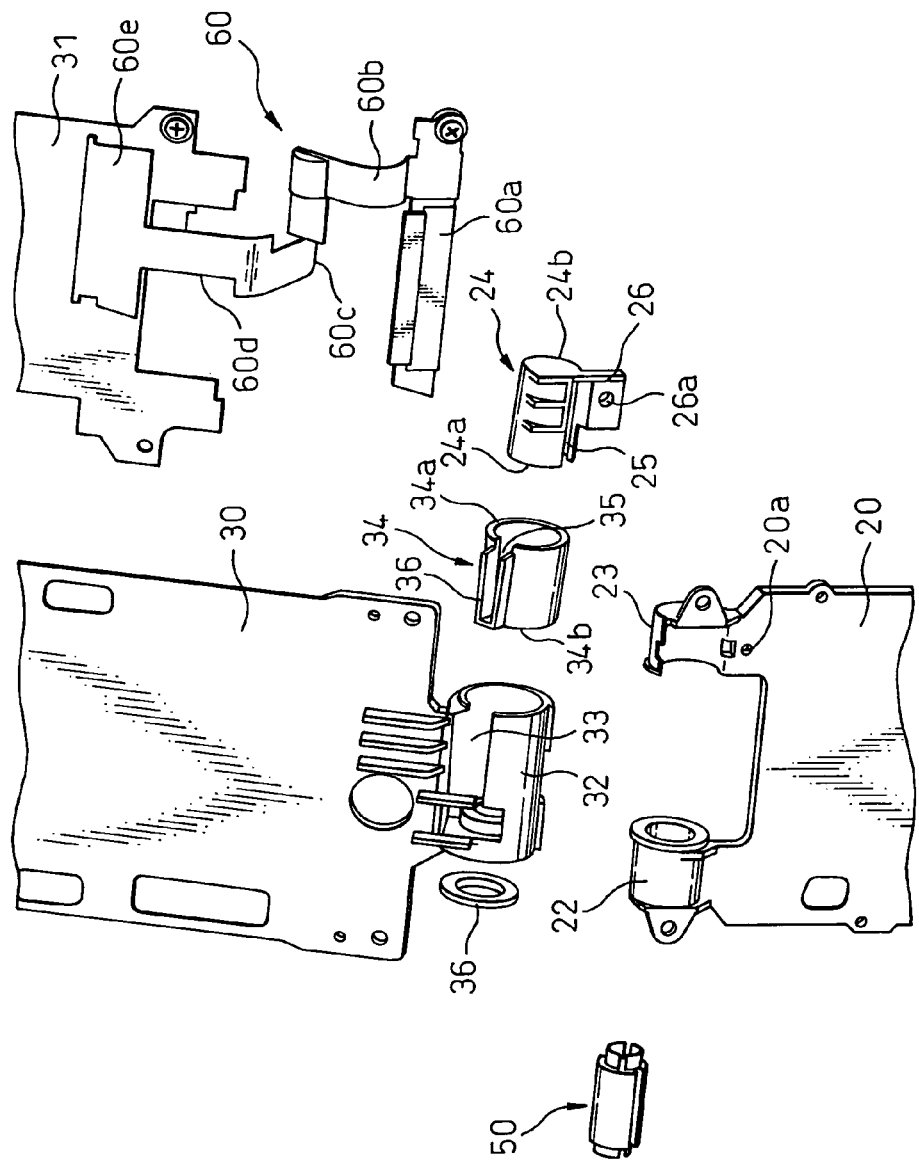
FIG. 3 is an exploded perspective view showing a hinge of the folding mobile phone shown in FIG. 2.
Figure 4:
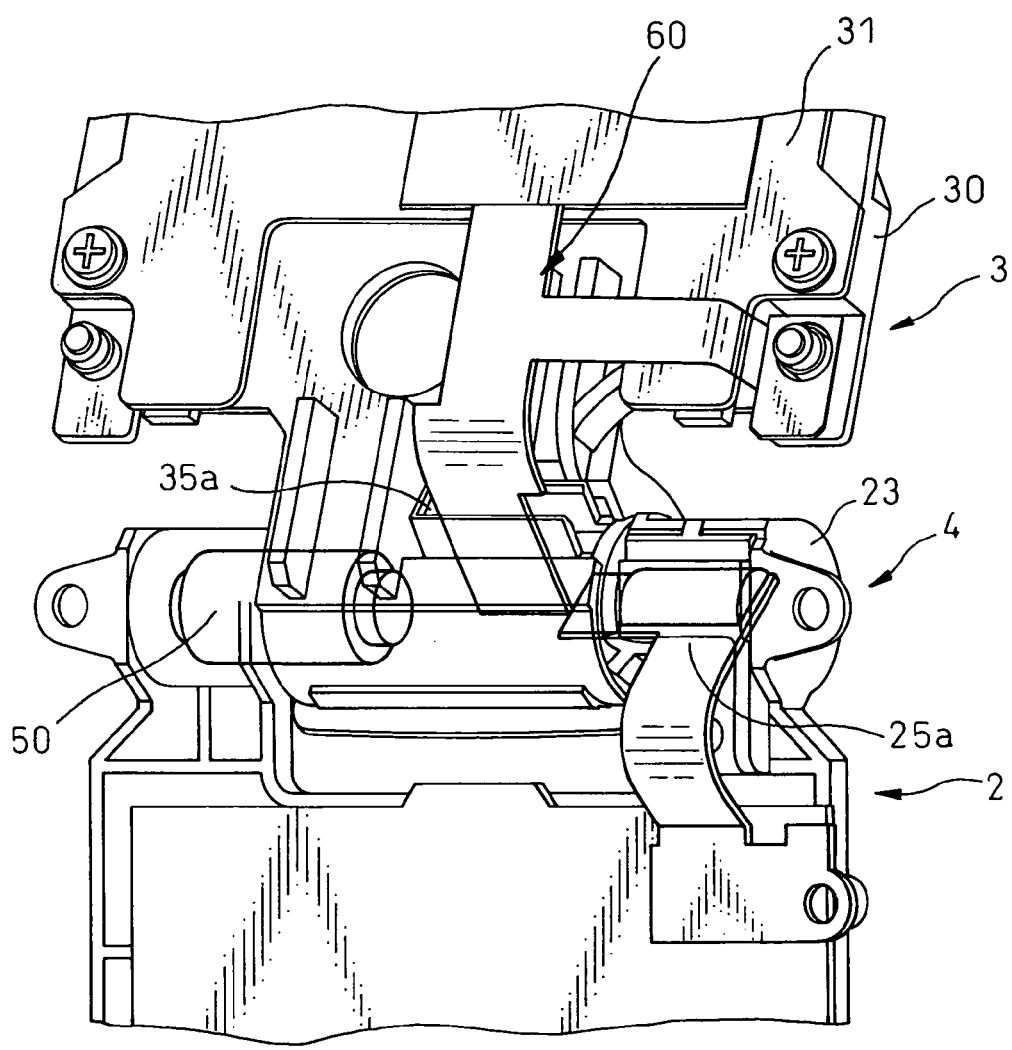
FIG. 4 is a perspective view showing a hinge of the folding mobile phone shown in FIG. 2.
Figure 5:
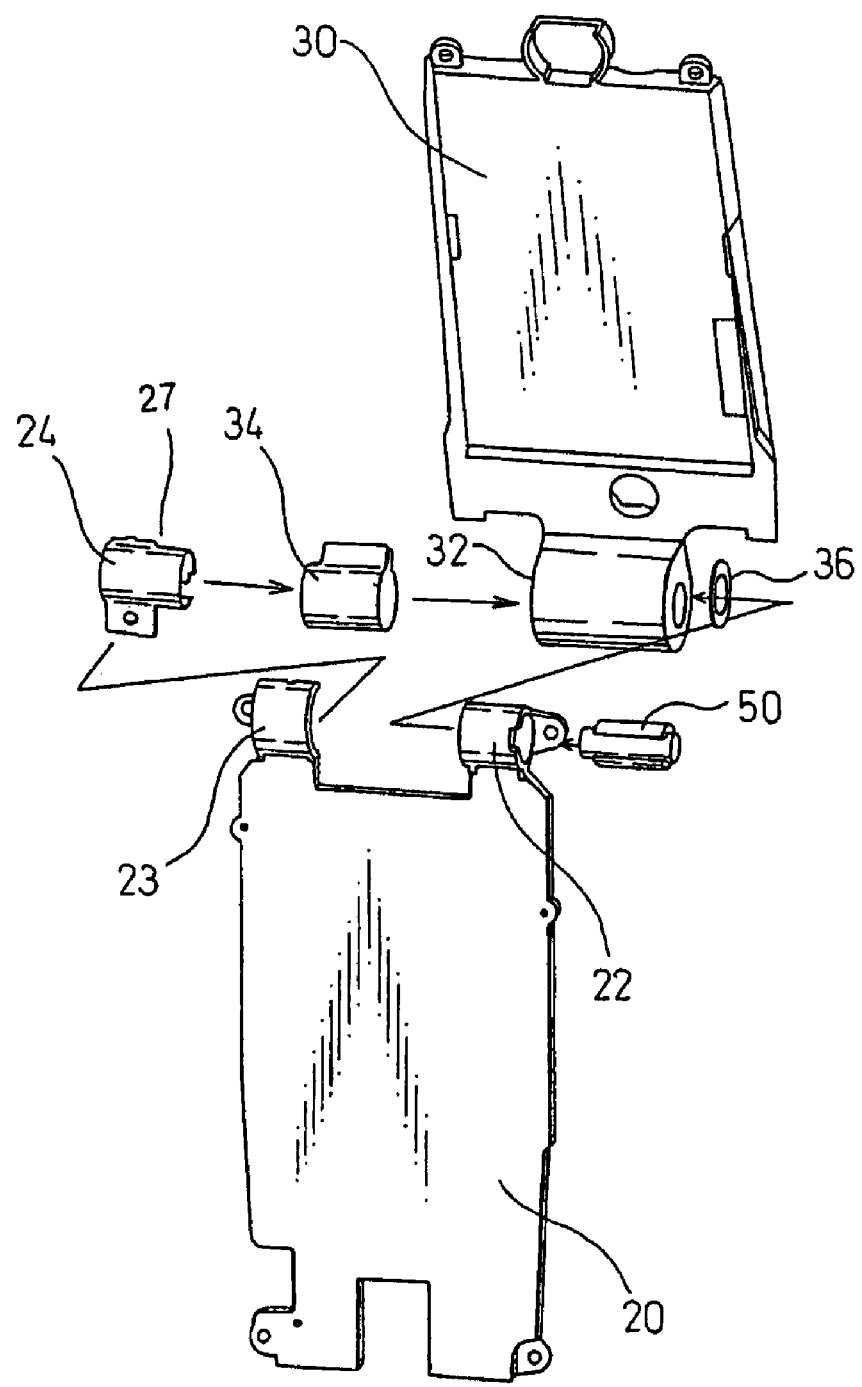
FIG. 5 is a perspective view of a chassis portion and a hinge of a folding mobile phone to which the present invention is applied, wherein the view is taken from the front side of the hinge.
Figure 6:
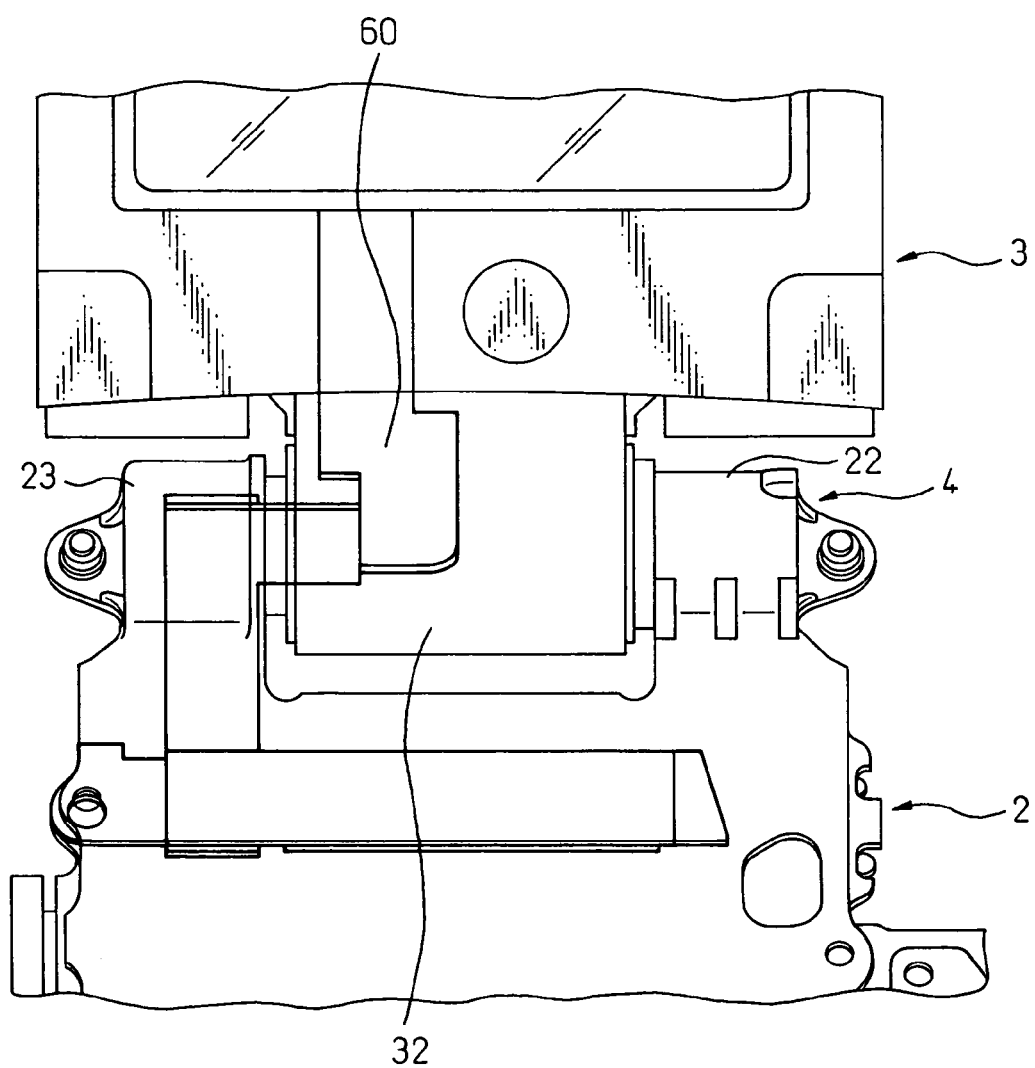
FIG. 6 is a perspective view of a hinge, wherein the view is taken from the front side.
Figure 7:
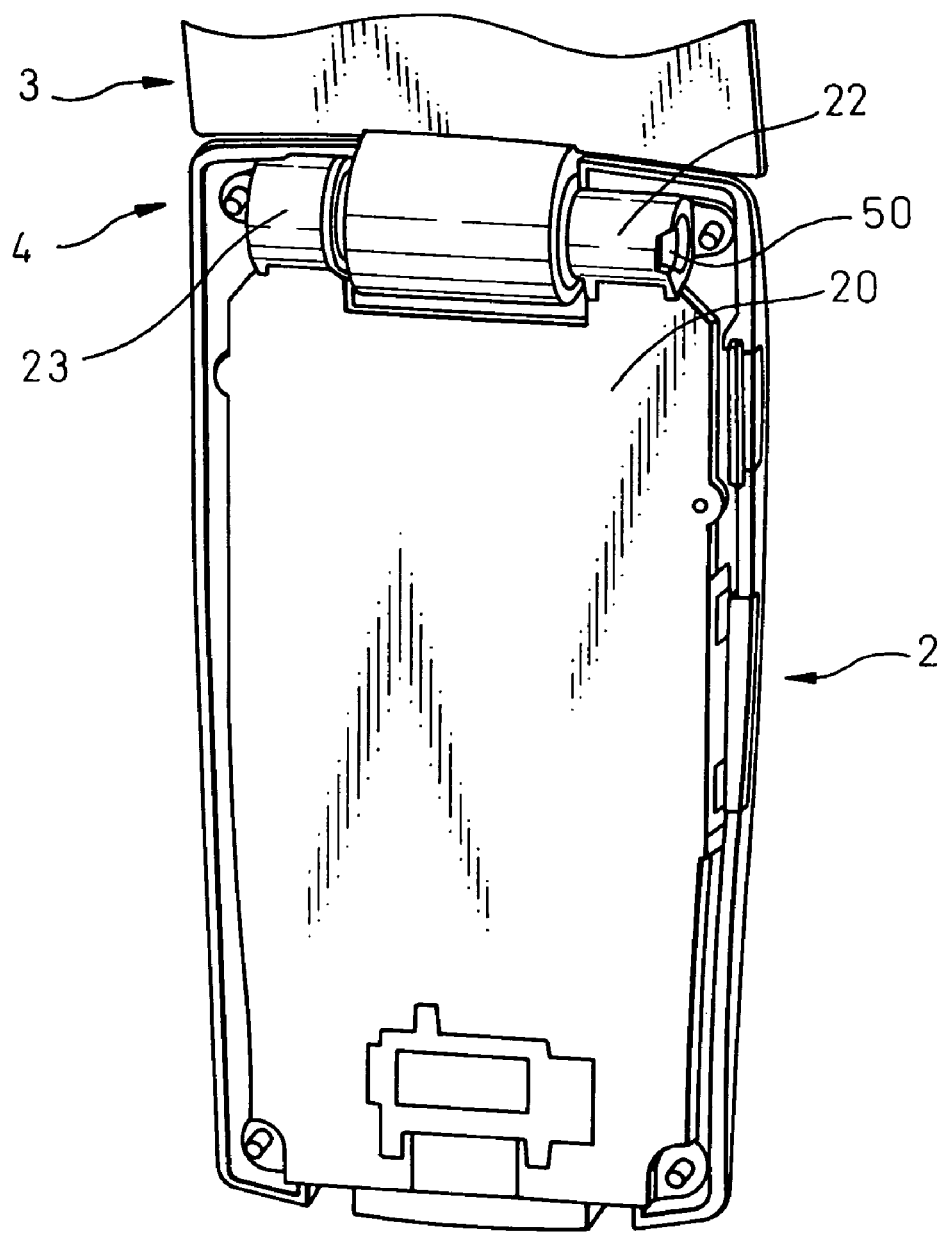
FIG. 7 is an exploded perspective view showing a state in which a chassis portion and a hinge of a folding mobile phone are connected to each other, wherein the view is taken from the front side.

FIG. 2 is a perspective view showing a folding mobile phone of the present invention in an open state, wherein the view is taken from the back face side after the outside cover has been removed. FIG. 3 is an exploded perspective view showing a hinge of the folding mobile phone shown in FIG. 2. FIG. 4 is a perspective view showing a hinge of the folding mobile phone shown in FIG. 2. FIG. 5 is a perspective view of a chassis portion and a hinge of a folding mobile phone to which the present invention is applied, wherein the view is taken from the front side of the hinge. FIG. 6 is a perspective view of a hinge, wherein the view is taken from the front side. FIG. 7 is an exploded perspective view showing a state in which a chassis portion and a hinge of a folding mobile phone are connected to each other, wherein the view is taken from the front side.

The first housing (the stationary portion) 2 includes: a key side case (not shown) arranged outside the first housing; a first (key side) chassis 20 arranged inside which is a structural reinforcing member of the electronic apparatus integrally formed out of magnesium by means of die casting; and a first (key side) printed circuit board 21 arranged inside which is attached to the first chassis 20.

The second housing (the movable portion) 3 includes: a liquid crystal display (LCD) side case (not shown); a second (LCD side) chassis 30 arranged inside which is a structural reinforcing member of the electronic apparatus integrally formed out of magnesium by means of die casting; and a second (LCD side) printed circuit board 31 provided in a space between LCD and the second chassis 30.

As described later, the first housing 2 and the second housing 3 are connected with each other by the flexible printed wiring plate (FPC) 60, which is the signal wiring, via the hinge 4. One end of FPC 60 is connected to the printed circuit board 20 of the first housing 2, and the other end of FPC 60 is connected to the printed circuit board 30 of the second housing 3. Therefore, irrespective of the open state or the closed state of the apparatus, FPC 60 electrically connects the first printed circuit board 21 of the first housing 2 with the second printed circuit board 30 of the second housing 3.

According to the present invention, the hinge 4, which connects the first housing (the stationary portion) 2 with the second housing (the stationary portion) 3 in such a manner that the first housing 2 and the second housing 3 can be opened and closed, is composed as follows.

At the end portion of the chassis 20 of the first housing 2 on the second housing 3 side, the cylindrical bearing portion 22 and the semi-cylindrical portion 23 are arranged in the axial direction at a predetermined interval. The cylindrical bearing portion 22 and the semi-cylindrical portion 23 are integrally formed out of magnesium by means of die casting.

On the other hand, the pipe formed portion 32 is provided at an end portion of the chassis 30 of the second housing 3 on the first housing 2 side. The pipe formed portion 32 is a portion of the chassis 30 and integrally formed out of magnesium by means of die casting. On the side wall of this pipe formed portion 32, the slit 33 is formed which extends in the axial direction to the opening portion on one side.

Concerning the pipe member 34 made of resin by means of molding, one end portion 34a of the pipe member 34 is open, and the other end portion 34b of the pipe member 34 is closed. On the side wall, the slit 35 corresponding to the slit 33 of the pipe formed portion 32 extends in the axial direction to the opening end 34a. On both sides of the slit 35, the rising wall 36 is integrally formed in the axial direction. The closed end portion 34b of the pipe member 34 is inserted in the axial direction into the pipe formed portion 32 from one side, so that the pipe member 34 can be engaged with the pipe formed portion 32. At this time, the rising walls 36 provided on both sides of the slit 35 are engaged with respective, opposite sides of the slit 33 of the pipe formed portion 32. Due to the foregoing, the pipe member 34 is engaged with and fixed to the pipe formed portion 32 being not capable of rotating.

One end portion 24a of the hollow shaft 24 is opened, and the other end 24b of the hollow shaft 24 is closed. On the side wall of the hollow shaft 24, the slit 25 is formed which extends in the axial direction to the opening end 24a. The hollow shaft 24 has a flange portion 26 by which the hollow shaft 24 is fixed to the chassis 20 of the first housing 2. For example, when a screw (not shown) is screwed into the screw hole 20a of the chassis 20 via the attaching hole 26a formed in the flange portion 26, the hollow shaft 24 is fixed to the chassis 20.

The hollow shaft 24 is pivotally engaged with the pipe member 34 when the hollow shaft 24 is inserted from the open end 24a side into the pipe member 34. In order to regulate a position of the hollow shaft 24 in the axial direction when the hollow shaft 24 is engaged with the pipe member 34 in the axial direction, the protrusion or the step portion 27 (see FIG. 5) is provided in the circumferential direction on the outer circumference of the hollow shaft 24.

When the hollow shaft 24 is inserted into and engaged with the pipe member 34 until the protrusion or the step portion 27 of the hollow shaft 24 comes into contact with the open end 34a of the pipe member 34, the slit 25 of the hollow shaft 24 extends and exists in the axial direction exceeding the engaging portion in which the hollow shaft 24 and the pipe member 34 are overlapped on each other, so that the slit opening portion 25a (shown in FIG. 2) can be defined. On the other hand, under the condition that the hollow shaft 24 is pivotally engaged with the pipe member 34, the slit 35 of the pipe member 34 extends and exist in the axial direction exceeding the engaging portion in which the hollow shaft 24 and the pipe member 34 are overlapped on each other, so that the slit opening portion 35a (shown in FIG. 2) can be defined.

Accordingly, under the condition that the hollow shaft 24 and the pipe member 34 are engaged with each other, a space portion for accommodating signal wires such as a flexible printed circuit 60 can be defined inside the hollow shaft 24 and the pipe member 34 and between the closed end 24b of the hollow shaft 24 and the closed end 34b of the pipe member 34.

The length of the pipe formed portion 32 of the chassis 30 in the axial direction corresponds to an interval between the bearing portion 22 and the semi-cylindrical portion 23, which are formed in the chassis 20 of the first housing 2, in the axial direction.

The hinge structure on one side of the hinge 4 in the axial direction is described as follows. Into the end portion of the pipe formed portion 32 of the chassis 30 on the side opposite to the insertion of the pipe member 34, the bearing ring 36 is inserted and fixed. When the pipe formed portion 32 is aligned in the axial direction with the cylindrical bearing portion 22 of the chassis 20 on the first housing 2 side, the hinge module 50 is inserted into the bearing portion 22 and the bearing ring member 36. This hinge module 50 pivotally connects the first housing 2 with the second housing 3 and regulates a rotary position between them.

As described before, the printed wiring board 21 of the first housing 2 and the printed wiring board 31 of the second housing 3 are electrically connected to each other by the flexible printed circuit 60 which functions as signal wires. As shown in FIG. 3, under the condition that this flexible printed circuit 60 is bent in two, the plane shape of the flexible printed circuit (FPC) 60 includes: a first base portion 60a which is connected to the printed circuit board 21 of the first housing 2; a first portion 60b extending from the first base portion 60a in the direction perpendicular to the hinge shaft; a portion 60c which is bent from the first portion by a substantially right angle and extended in parallel with the hinge shaft; a second portion 60d which is bent from the portion 60c, which is parallel with the hinge shaft, at a substantially right angle and extended in the direction perpendicular to the hinge shaft; and a second base portion 60e which is connected with the second portion 60d and connected to the printed circuit board 31 of the second housing 3. In this way, the plane shape of the flexible printed circuit 60 is continuous.

On the other hand, even when a relative rotary position between the first housing 2 and the second housing 3 is located anywhere, when the slit opening portions 25a, 35a (shown in FIG. 2) located at both end portions are open by a predetermined slit width and when the first portion 60b of the flexible printed circuit 60 enters the slit opening portion 25a (shown in FIG. 2) of the hollow shaft 24 and when the portion 60c parallel with the hinge shaft is accommodated in this space and the second portion 60d comes out from the slit opening portion 35a (shown in FIG. 2) of the pipe member 34, the flexible printed circuit plate 60 can stably extend from the first housing 2 to the second housing 3.

The flexible printed circuit 60 is incorporated as follows. Under the condition that the first base portion 60a and the second base portion 60e are respectively connected to the printed wiring board 21 of the first housing 2 and the printed wiring board 31 of the second housing 3, the rotary positions of both housings are adjusted at a position where the slit 25 of the hollow pipe 24 and the slit 35 of the pipe member 34 are aligned to each other. Then, the portion 60c parallel with the hinge shaft is inserted into these slits 25, 35, and the first portion 60b and the second portion 60d are respectively drawn out from the slit opening portions 25a, 35a (shown in FIG. 2) of the hollow shaft 24 and the pipe member 34. In this way, the flexible printed circuit 60 can be easily incorporated into the hinge.

Explanations are made of the embodiment of the present invention referring to the accompanying drawings. It should be noted that the present invention is not limited to the above specific embodiment. Variations or modifications may be made by those skilled in the art without departing from the spirit and scope of the present invention.

As described above, according to the present invention, the hinge includes a pipe portion and a bearing portion which are formed integrally with the structural reinforcing member composing the first housing and the second housing and further includes a hollow shaft attached to them. Therefore, the rigidity of the hinge is sufficiently high. Even when the apparatus is repeatedly opened and closed, the mechanical strength can be maintained high and the accuracy of the hinge shaft can be also maintained high.

Slits are provided in the pipe portion and the hollow shaft. These slits extend to positions shifted from the engaging portion of the pipe portion with the hollow shaft in the axial direction and define the slit opening portion. Therefore, when signal wires such as a flexible printed circuit plate are inserted from the slit or the slit opening portion, assembling can be easily performed.

The invention claimed is:

1. A folding electronic apparatus in which a first housing and a second housing are connected to each other by a hinge having an axis and are capable of being opened and closed with respect to each other by rotation about the hinge axis, the hinge including: a pipe portion having a first slit on a side wall, the pipe portion being attached to one of the first housing and the second housing; and a hollow shaft having a second slit on the side wall, the hollow shaft being attached to the other of the first housing and the second housing, the hollow shaft being engaged inside the pipe portion, wherein the first and second slits extend to positions shifted from an engaging portion of the pipe portion with the hollow shaft in the axial direction and define opening portions of the first and second slits.

2. A folding electronic apparatus according to claim 1, wherein the first slit provided on the side wall of the pipe portion extends in the axial direction, the second slit provided on the side wall of the hollow shaft also extends in the axial direction, and when the first and second housings are located at a predetermined angular position about the hinge axis, the first and second slits are aligned and continuous with each other in the axial direction.

3. A folding electronic apparatus according to claim 1, further comprising: a first printed circuit board attached inside one of the housings; a second printed circuit board attached inside the other of the housings; and signal wires electrically connecting the first printed circuit board with the second printed circuit board, wherein one end portion of the signal wires connects to the first printed circuit board, enters the first slit opening portion of the pipe portion, passes inside the pipe portion and the hollow shaft portion, comes out from the second slit opening portion of the hollow shaft portion and connects to the second printed circuit board.

4. A folding electronic apparatus according to claim 3, wherein the signal wires are formed into a flexible printed circuit.

5. A folding electronic apparatus according to claim 4, the flexible circuit plate including: a first base portion connected to the first printed circuit board; a first portion extended from the first base portion in the direction perpendicular to the hinge axis; a portion bent from the first portion in the direction parallel with the hinge axis; a second portion bent from a portion which extends in the direction parallel with the hinge axis, extending again in the direction perpendicular to the hinge axis; and the second base portion connected to the second portion and connected to the second printed circuit board, wherein the flexible circuit plate is formed into a plane shape.

6. A folding electronic apparatus according to claim 5, wherein the plane shape of the flexible printed circuit is folded in two.

7. A folding electronic apparatus according to claim 5, wherein the portion of the flexible printed circuit, which is parallel with the hinge axis, passes inside the pipe portion and the hollow shaft portion.

8. A folding electronic apparatus according to claim 1, wherein an end portion of the hollow shaft in the axial direction on the side opposite to the side engaged with the pipe portion is closed with a wall, an end portion of the pipe portion in the axial direction on the side opposite to the side engaged with the hollow shaft is closed with a wall, and a space portion for accommodating the flexible printed circuit is defined by the inside of the pipe portion and the inside of the hollow shaft and by the respective walls closing the corresponding end portions of the pipe portion and the hollow shaft portion.

9. A folding electronic apparatus according to claim 1, the pipe portion including: a pipe formed portion integrally formed on the first chassis, a structural reinforcing member comprising one of the housings; and a pipe member engaged inside the pipe formed portion, wherein slit portions are respectively formed in the pipe formed portion and the pipe member at positions corresponding to each other, and are aligned with each other to form the first slit.

10. A folding electronic apparatus according to claim 9, wherein the pipe member is formed of resin, the pipe member has rising walls on both sides of the slit, the first chassis is integrally formed of magnesium by means of die casting, and when the rising walls on both sides of the pipe member are engaged with the slit of the pipe formed portion, the pipe member is engaged non-rotatably with the pipe formed portion of the first chassis.

11. A folding electronic apparatus according to claim 1, wherein the other of the housings has a second chassis which is a structural reinforcing member, integrally formed of magnesium by means of die casting, and the hollow shaft has a flange portion fixed to the second chassis by means of screwing.

12. A folding electronic apparatus according to claim 1, wherein the hollow shaft has a protrusion or a step, which regulates a position of the hollow shaft in the axial direction when the hollow shaft is pivotally engaged with the pipe portion, on the outer circumference thereof.

13. A folding electronic apparatus according to claim 1, wherein both sides of the pipe portion of one of the housings are open, the hollow shaft is engaged with the first opening portion, and a hinge module is inserted into the second opening portion and the bearing portion of the other of the housings.

14. A folding electronic apparatus according to claim 13, wherein the other of the housings has a second chassis which is a structural reinforcing member, integrally formed of magnesium by means of die casting, the bearing portion of the other of the housings is formed as a portion of the second chassis and, further, the second chassis has a semi-cylindrical portion to cover the hollow shaft.

15. A folding electronic apparatus according to claim 13, wherein the hinge module is engaged with the second opening portion of the pipe portion of one of the housings and the bearing portion of the other of the housings, and regulates a rotary position between the first housing and the second housing.

16. A folding electronic apparatus according to claim 1, wherein the folding electronic apparatus is a folding mobile phone.

17. A folding electronic apparatus in which a first housing and a second housing are connected to each other by a hinge being capable of being opened and closed, the hinge including:
a pipe portion integrally formed with a structural reinforcing member of the first housing; a bearing portion integrally formed with a structural reinforcing member of the second housing; and a hollow shaft fixed to the structural reinforcing member of the second housing, wherein
the hollow shaft is pivotally inserted into and engaged with one of the opening portions of the pipe portion, and a hinge module penetrates the other side of the pipe portion and the bearing portion.

18. A folding electronic apparatus according to claim 17, wherein the first slit is provided on the side wall of the pipe portion, the second slit is provided on the side wall of the hollow shaft, and the first and the second slits extend to a position shifted in the axial direction from the engaging portion of the pipe portion with the hollow shaft portion and define the first and the second slit opening portions.

* * * * *